US008145611B2

(12) United States Patent
McCall (10) Patent No.: US 8,145,611 B2
(45) Date of Patent: Mar. 27, 2012

(54) SERVICING QUERIES IN A DATABASE SYSTEM

(75) Inventor: Glenn McCall, Canberra (AU)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 11/532,547

(22) Filed: Sep. 18, 2006

(65) Prior Publication Data

US 2007/0067352 A1   Mar. 22, 2007

Related U.S. Application Data

(60) Provisional application No. 60/718,838, filed on Sep. 20, 2005.

(51) Int. Cl.
*G06F 17/30* (2006.01)
*G06F 17/00* (2006.01)

(52) U.S. Cl. .................. 707/705; 711/170; 709/203

(58) Field of Classification Search .................. 707/1–6, 707/705; 711/170; 709/203
See application file for complete search history.

(56) References Cited

U.S. PATENT DOCUMENTS

| | | | | |
|---|---|---|---|---|
| 5,642,515 | A * | 6/1997 | Jones et al. | 710/220 |
| 5,913,029 | A * | 6/1999 | Shostak | 709/203 |
| 6,138,120 | A * | 10/2000 | Gongwer et al. | 707/10 |
| 6,460,043 | B1 * | 10/2002 | Tabbara et al. | 707/100 |
| 6,604,182 | B1 * | 8/2003 | Sexton et al. | 711/170 |
| 7,334,017 | B2 * | 2/2008 | Hawkes et al. | 709/205 |
| 7,349,900 | B1 * | 3/2008 | Qin | 707/6 |
| 7,937,493 | B2 * | 5/2011 | Colrain et al. | 709/244 |

* cited by examiner

*Primary Examiner* — Yicun Wu
(74) *Attorney, Agent, or Firm* — John D. Cowart; Ramin Mahboubian (57) ABSTRACT

A system and method for managing SQL queries in a database system. The system and method allocates database sessions to database queries and manages the database sessions and queries to provide improved, near real-time access to a database system.

50 Claims, 8 Drawing Sheets

SERVICING QUERIES IN A DATABASE SYSTEM

CROSS REFERENCE TO OTHER APPLICATIONS

This application claims priority under 35 U.S.C. §119(e) to the following commonly-assigned patent application, which is incorporated herein by reference: U.S. Provisional Application Ser. No. 60/718,838, entitled "SERVICING QUERIES IN A DATABASE SYSTEM," filed on Sep. 20, 2005.

BACKGROUND

Databases which respond to queries are widely used. In such databases, a client—such as a client application—submits a query to the database, and the database provides a query response in reply.

In many databases, database sessions are used to manage database communication resources, which are limited. A database session is, in effect, a communication line between a database and a user. In such databases, a query is submitted to the database using a database session. Hence, when a client of the database wishes to query the database, it is necessary to procure the use of a database session through which to process the query. Conversely, if a database session cannot be obtained, it is not possible to query the database. Where a relatively large number of clients wish to query the database, it becomes preferable to have a system for managing the allocation of database sessions.

The term "database session" is, for the purpose of this specification, meant to be synonymous with the term "application session". In some databases, the term "application session" is used by way of preference, and exemplifies the fact that the application gains control of and uses the session.

One existing system for managing database sessions is commonly known as connection pooling. In connection pooling, a server maintains a pool of available database sessions, although these are not an unlimited resource, and the pool is subject to becoming empty. A client application wishing to query the database makes a request for a database session. In response—and where possible—the server allocates a database session to the client from the pool of available database sessions. Effectively, the server lets the client "borrow" one of the sessions. Once the client is allocated a session, the client gains control of the session. That is, the client may use—or not use—the session as desired. When the client decides that it has finished with the session, it should take the active step of returning the session to the server. If the client does not return the session to the server, the session remains inactive and unavailable until such a time as the server recognises and reclaims the inactive session. As such, there are time periods during which the client does not necessarily use the session—that is, provide queries to the database—although the client has control of the session. In particular, the session is idle when no queries are being submitted. Effectively, the allocated resource is reserved for use, but not actually used.

In connection pooling, a single session is required for each client that wishes to query the database. That is, if there were 50 clients that wished to query the database over a predetermined period, it would be necessary to supply 50 sessions during that period. A problem arises given that sessions are a finite resource—the pool is inherently limited and subject to becoming emptied. When the number of clients wishing to query the database exceeds the number sessions available, one or more clients will not be able to borrow a session, and as such will not be able to query the database. These clients must wait until other clients return sessions.

It will be appreciated that, where connection pooling is used, the database will not always be available for querying by all clients. It will further be appreciated that users are prevented from querying the database even where the database is being queried well within the operational limitations of that database.

Any discussion of the prior art throughout the specification should in no way be considered as an admission that such prior art is widely known or forms part of common general knowledge in the field.

SUMMARY

It is an object of the present invention to overcome or ameliorate at least one of the disadvantages of the prior art, or to provide a useful alternative.

According to a first aspect of the invention, there is provided a system for managing a database, the system including:

a first interface for receiving from a client a query of the database; and a processor responsive to the first interface for allocating a database session to the query and for running the query through the allocated database session to obtain a query response from the database.

According to a second aspect of the invention, there is provided a method for managing a database, the method including the steps of:

receiving from a client a query of the database;

allocating a database session to the query; and running the query through the allocated database session to obtain a query response from the database.

BRIEF DESCRIPTION OF THE DRAWINGS

Additional benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Referring to the drawings, it will be appreciated that, in the different figures, corresponding features have been denoted by corresponding reference numerals.

Figure 1:
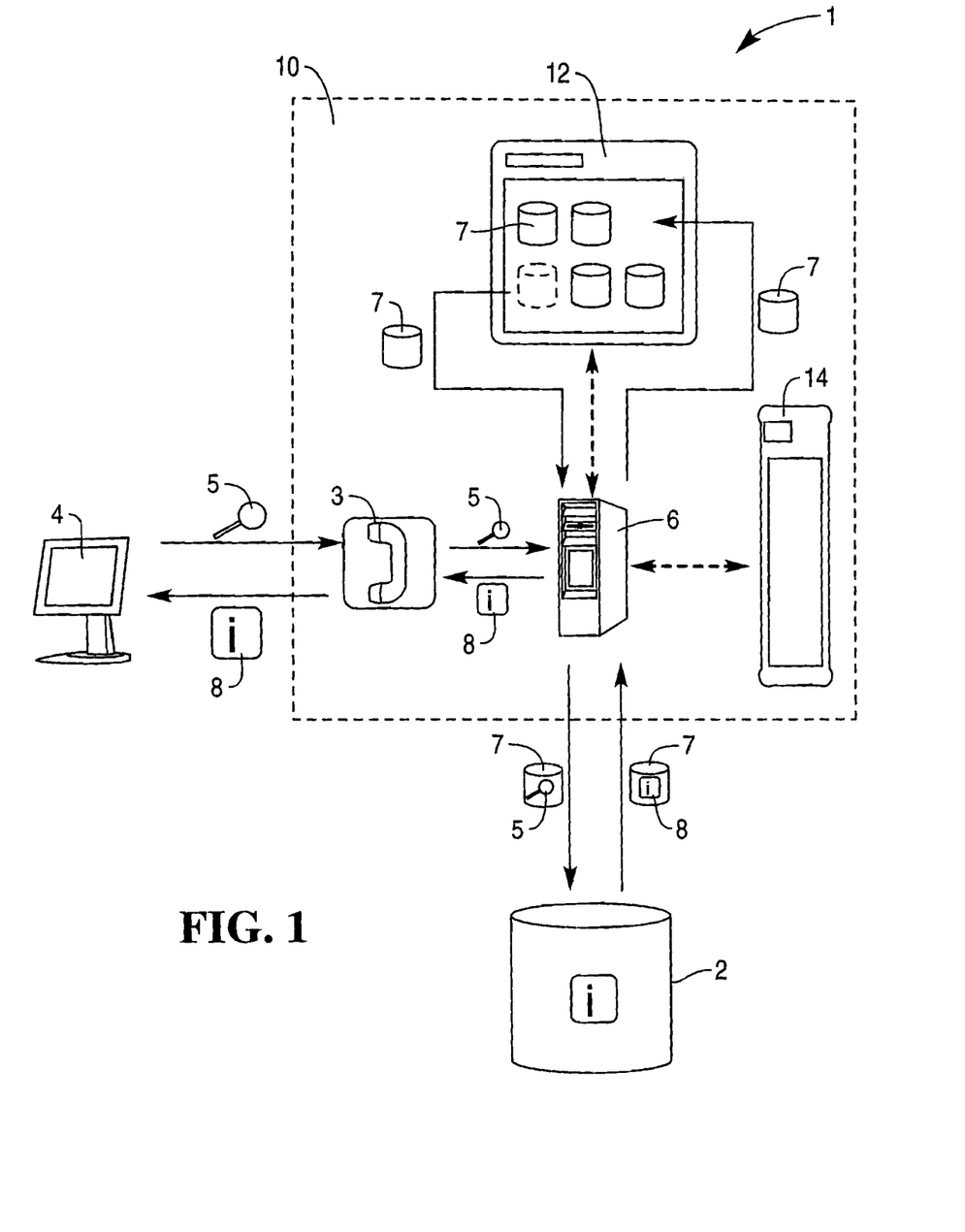
FIG. 1 is a schematic view of a system according to the invention.
Figure 2:
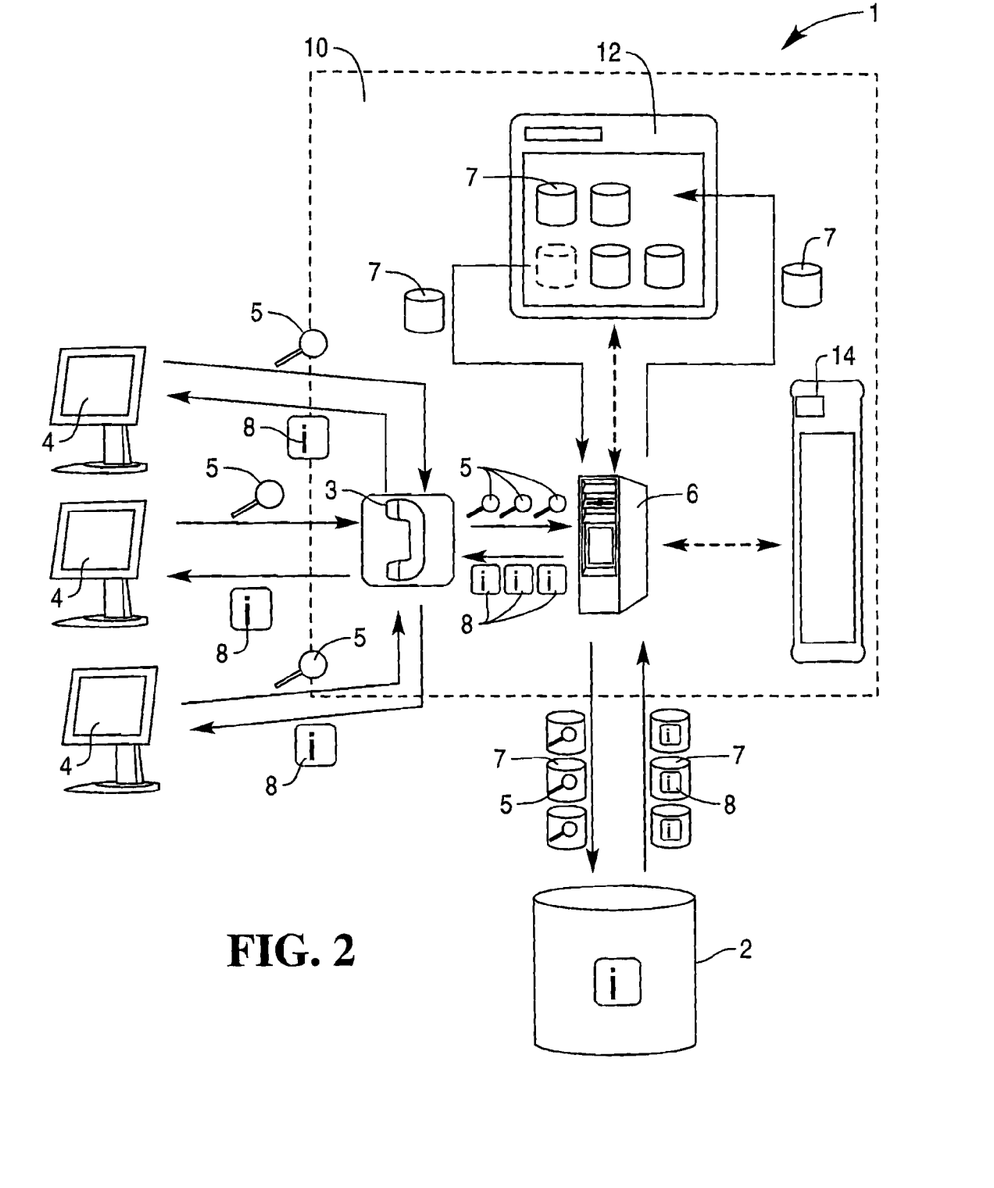
FIG. 2 is a further schematic view of the system of FIG. 1.

Referring initially to FIG. 1, there is provided a system 1 for managing a database 2. System 1 includes a first interface, in the form of a network communications port 3. Port 3 is for receiving from a client, in the form of a client application 4, a query 5 of database 2. System 1 also includes a processor, in the form of a CPU 6. CPU 6 is responsive to port 3 for allocating a database session 7 to query 5, and for running query 5 through allocated database session 7 to obtain a query response 8 from database 2.

Query response 8 is effectively the "answer" provided by database 2 in response to query 8, and is in the form of an information packet. Query response 8 is not necessarily the information desired by application 4, at times being an error message indicating that the query was not successful for a given reason.

It will be appreciated that system 1 is scalable to operate in conjunction with a plurality of applications 4 that provide a respective plurality of queries 5 of database 2. The various figures illustrate system 1 in differing states of activity.

In the present embodiment, database 2 is a generic SQL type database. In other embodiments alternate databases are used, appropriate databases being recognizable to persons skilled in art. It will be appreciated that embodiments of the invention are applicable to almost any database that responds to queries. Indeed, embodiments of the invention have application in most information systems that receive and process commands.

Appropriate databases include Teradata™ databases, such as Teradata™ Database V2R5. Teradata is a registered trademark of Teradata Corporation.

In some embodiments, database 2 is replaced by an alternate data source, including any one or more of:
an application;
a table;
a network;
an information storage device;
a file; and
an operating system.

In the present embodiment, port 3 is responsive to CPU 6 for communicating query response 8 to client application 4. In other embodiments, alternate measures are taken to communicate query response 8 to client application 4, such as a discrete communication interface.

In this embodiment, port 3 communicates with client application 4 over the internet, while other embodiments are not limited by this form of communication. That is, port 3 is the interface by which CPU 6 is connected to a wider communications network. More specifically, client application 4 submits query 5 in an interface (not shown), and the interface transmits query 5 via the internet to port 3. In other embodiments, communication between client application 4 and port 3 is conducted via alternate communication methods. Examples of these alternatives include local area networks, wide area networks, wireless networks, telecommunication links, and the like. Combinations of these alternatives are also used in other embodiments. In some further embodiments CPU 6 and application 4 are contained in a single computing apparatus, and port 3 is an internal component of that apparatus.

Client application 4 is graphically represented by a visual display unit to signify an interface for submitting queries and receiving information. In the present embodiment application 4 is a client application that queries database 2 as part of its usual operation. It should be noted that, although represented by like icons, applications 4 include a variety of differing applications. The only necessary similarity is the functionality to provide queries to database 2. For example, some applications 4 include an inventory application for checking product stocks availability. To this end, database 2 contains information indicative of the product stocks and availability. For example, a client uses application 4 to check on the number of units of a Product X currently in stock at a Warehouse Y. In response to a user's activity within client application 4, client application 4 submits query 5 through system 1 to obtain query response 8. In this example, query response 8 contains information indicative of the number of units of Product X currently in stock at Warehouse Y. This information is processed by client application 4 and passed on to the respective user. In other embodiments, client application 4 is replaced by alternate components that perform the function of querying database 2. Such components include administrative tools, data acquisition processes, query-specific interfaces, and the like.

In some embodiments multi-user web applications are present, which provide a high volume of relatively rudimentary queries from a large number of users. In further embodiments, multi-user client/server applications are present, which provide higher order queries from relatively fewer users. In still further embodiments, system 1 is used in conjunctions with applications 6 that provide short-term high-volume bursts of queries.

Application 6 is, in some embodiments, part of a hardware system such as an EFTPOS terminal, Automatic Teller Machine or bar code scanner. In such embodiments, it is not unusual for the hardware system to submit a range of different queries in parallel.

Upon receipt of query 5, port 3 communicates query 5 to CPU 6. In response, CPU 6 allocates a database session 7 to query 5. Database sessions 7 are represented by miniaturised database symbols. It is, however, appreciated that a two-way arrow intermediate CPU 6 and database 2 would arguably provide more technically accurate representation of a database. The rational is that a database session is representative of a communication line between CPU 6 and database 2. This being said, the miniaturised database sessions are used to conveniently represent the status of the communication line. For example, the communication line is either inactive, submitting a query, or providing a query response. These are implanted with symbols indicative of query 5 and query response 8 to designate the information that is being carried to and from database 2 as part of session 7. A database symbol 7 is empty to designate that it is not being used to query database 7. These graphical representations are for the purposes of schematic illustration only, and are not meant to be a technical representation of process involved in querying a database through an application session. The technical process will depend on the specific database used, and will be understood by those skilled in the art.

In the present embodiment, CPU 6 is a discrete unit that is part of a server 10. CPU 6 represents both hardware and software components. Appropriate components will be known to those skilled in the art. In other embodiments CPU 6 is integrally located within the driver of database 2. In further embodiments, the driver of database 2 performs some of the functionalities of CPU 6, whilst one or more external units perform other functionalities.

Server 10 maintains a predetermined number of database sessions 7. In the present embodiment the predetermined number of sessions 7 is selected by reference to the maximum capacity of database 2 for handling queries 5. In alternate embodiments the predetermined number is selected with reference to other factors. In some embodiments, the predetermined number varies over time in accordance with other factors. For example, in some embodiments server 10 maintains more sessions 7 during business hours, and fewer sessions 7 outside of business hours. In some embodiments the number of sessions 7 is increased with demand up to a predetermined maximum.

Upon start up, server 10 initiates the predetermined number of sessions 7. In the present embodiment, the driver of database 2 is modified for direct and convenient integration with server 10. In other embodiments, server 10 maintains sessions 7 as allowable under the rules and functionalities of a different respective database 2. For example, in some embodiments database 2 is set up for connection pooling, using a connection pooling server (not shown). In such embodiments, server 10 borrows the predetermined number of sessions 7 from the connection pooling server, and retains these sessions indefinitely.

This specification describes, in some detail, two separate allocation procedures by which a session 7 is allocated to a query 5. The first allocation procedure involves the implementation of some further processing capabilities within CPU 6. This is used in implementations of system 1 that do not leverage allocation functionality from the runtime environment of database 2. The second allocation procedure leverages the allocation functionality of the runtime environment of database 2, and as such reduces the complexity of system 1.

It is noted that the schematic representations provided in the various figures are equally applicable to the first and second allocation procedures, although some conceptual differentiation between the natures of the components is required.

Firstly, an embodiment making use of the first allocation procedure is described. In this embodiment, server 10 keeps a register 12 of those of sessions 7 through which a query is not being run. As mentioned above, these are designated by empty miniaturized database symbols, and are available sessions 7. In the present embodiment, register 12 is a software-based storage allocation within server 10, having an interface for communication with CPU 6. In the present embodiment, CPU 6 has continuous knowledge of the contents of register 12. Further, CPU 6 has functional capabilities to remove a session 7 from register 12 or replace a session 7 to register 12. In some embodiments register 12 is integrated in CPU 6.

Figure 3:
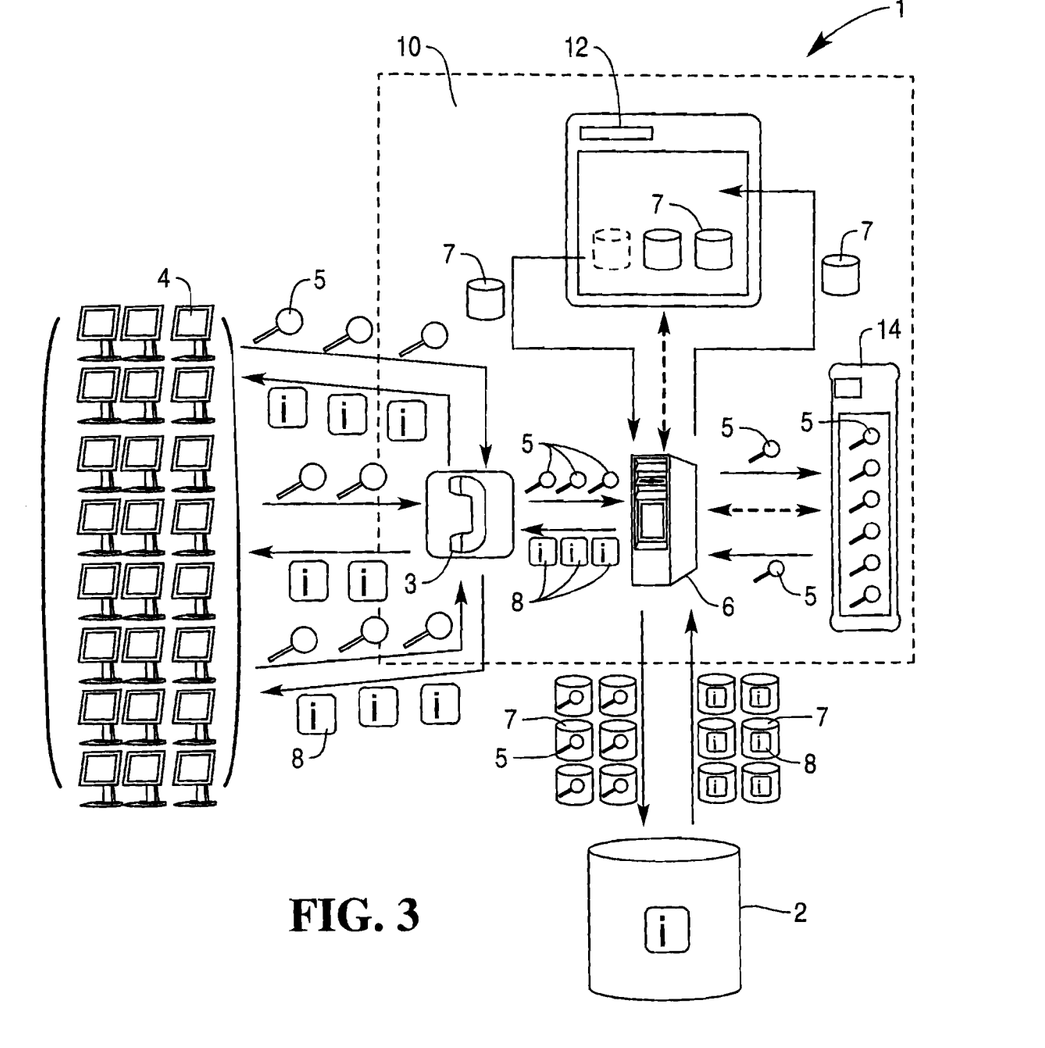
FIG. 3 is a further schematic view of the system of FIG. 1.

In allocating a session 7 to query 5, CPU 6 first selects an available session 7 from register 12. In the embodiment of FIG. 1, register 12 includes a plurality of available sessions 7. In FIG. 3, there are insufficient sessions 7 in register 12 to handle the number of queries 5. The result of this is dealt with below. Where a session 7 is available, CPU 6 allocates a session 7 to query 5. CPU 6 then removes the allocated session 7 from register 12, and runs query 5 though the allocated session 7. CPU 6 subsequently returns the allocated session 7 to register 12 after the associated query response 8 is obtained from database 2.

Although the terminology used in this specification refers to removing a session 6 from register 12, and subsequently replacing that session 7 in register 12, there is no practical need for physical removal and or replacement of the session. As such, this terminology should not limit the specification insofar as practical implementations are concerned. That is, the "removal" of a session from register 12 is conceptual and not necessarily indicative of a physical removal. In particular, it should not be confused with the notion of "borrowing" in connection pooling. The notion of "removal" is primarily indicative of a change in the state of a session from idle or available to in-use. A session removed from register 12 is "in-use", and as such not available for other tasks. That said, in some embodiments sessions are physically maintained within register 12 whilst in-use and as such are only "removed" in a conceptual sense in that they are not available.

Figure 8:
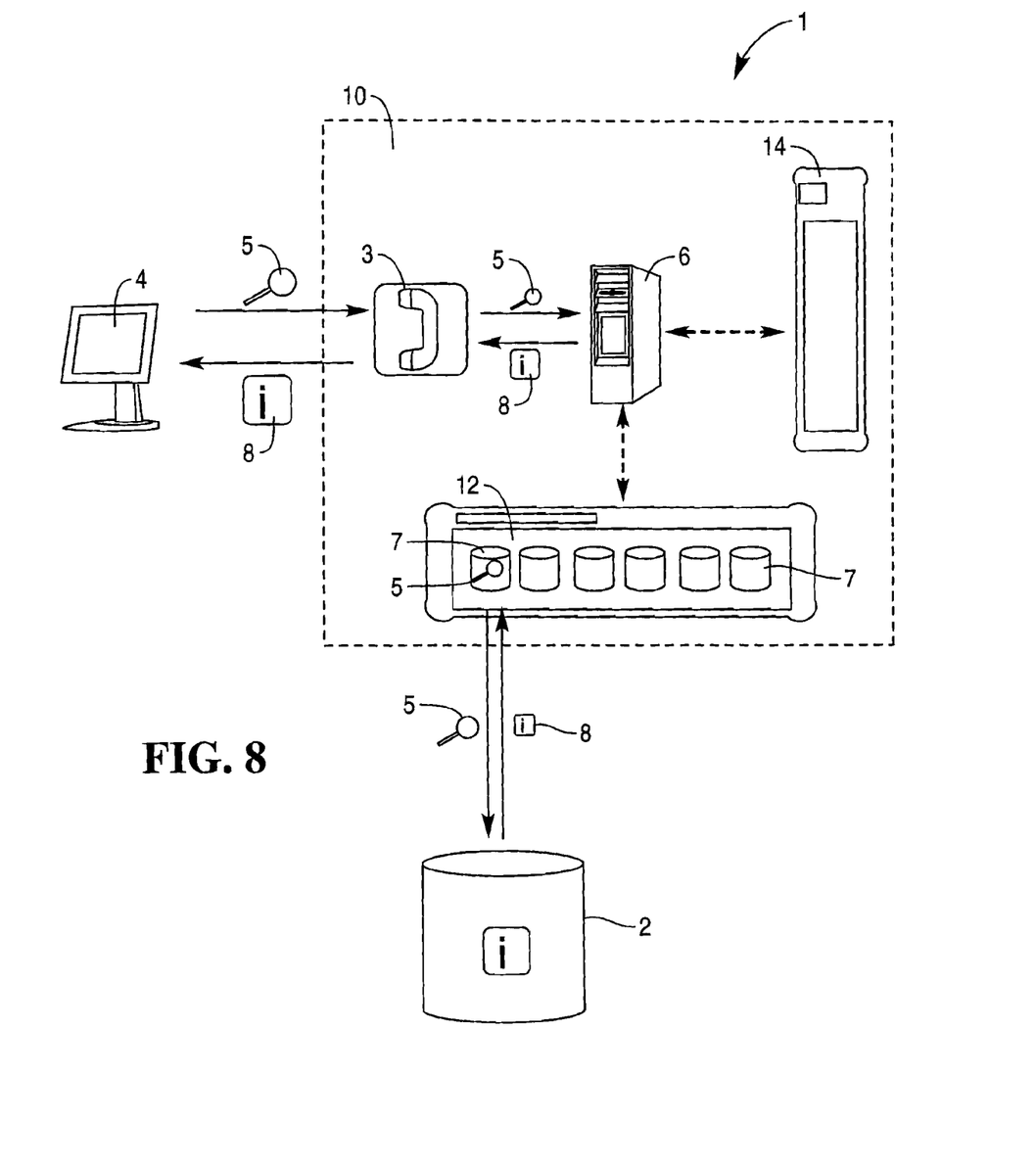
FIG. 8 is an alternate schematic representation of the system of FIG. 1.

FIG. 8 provides an alternate schematic representation of FIG. 1 wherein the "removal" is less apparent. In this representation, CPU 6 is shown in communication with register 12, which represents a pool of sessions 7. In this representation, all but one of sessions 7 is idle. The non-idle (or in-use) session is used to run query 6 through database 2. This session remains in register 12 at all times, yet is removed from a conceptual list of available or idle sessions within register 12. It will be appreciated that various embodiments disclosed within this specification are equally adapted for representation in the FIG. 8 style as the FIG. 1 style without necessarily any limitation on the implementation of system 1 in a practical sense. That is, register 12 is to some degree a conceptual component and is embodied in various forms depending on various external factors, such as coding requirements and component leveraging. Those skilled in the art will recognise a number of possible embodiments and implementations for register 12, both as a discrete and integrated component.

Under the first allocation procedure, almost all available sessions 7 are kept in register 12. It will be appreciated that some available sessions will not be kept in register 12, such as those just removed by CPU 4, or those just about to be returned to register 12 by CPU 4. In some embodiments some available sessions 7 are kept at a further location (not shown) for emergency or administrator usage. In alternate embodiments, server 10 only keeps a register of a limited selection of available sessions 7.

In the present embodiment, register 12 is updated in real-time. In some embodiments, register 12 is updated at predetermined intervals, or during predetermined polling periods. In other embodiments register 12 is updated upon the occurrence of one or more predefined events, such as a session 7 being initiated by server 10;
a session 7 being removed from register 12;
a session 7 being returned to register 12;
a query 5 being received by port 3;
a session 7 being allocated to a query 5; and
a session 7 being terminated by server 10.

It will be appreciated that the mode of updating register 12 will directly effect the efficacy of system 1, particularly where the number of queries 5 is close to or greater than the number of sessions 7. As a general rule, the busier the system, the more often register 12 requires updating.

In the present embodiment, CPU 6 is responsive to predetermined conditions being satisfied before allocating a database session 7 to query 5. In the present embodiment there are four predetermined conditions, although in other embodiments more, less or alternate conditions are used.

The first condition is whether register 12 includes an available database session 7. If register 12 includes one or more available database sessions 7, the first condition is satisfied. If register 12 does not include any available database sessions 7, the first condition is not satisfied.

If the first condition is not satisfied, CPU 6 places query 5 in a queue 14. CPU 6 is in communication with queue 14 for placing queries 5 in the queue or removing queries 5 from the queue. In this embodiment, queue 14 is a digitally constructed software based queue, and not a physical queue as such. A suitable digitally constructed queue includes a ranked storage interface wherein queries are stored an ordered with reference to information attributable to that query. In some embodiments CPU 6 includes a database (not shown) to handle the functionality of queue 14. Queries 5 in queue 14 are ranked in accordance with importance, as is described further below.

The second condition is whether queue 14 includes one or more queries 5. If queue 14 does not include any queries 5, the second condition is satisfied. If queue 14 includes one or more queries 5 the second condition is not satisfied.

If the second condition is not satisfied, query 5 is placed in queue 14.

If the first and second conditions are both satisfied, CPU 6 allocates an available database session 7 to query 5. As such, CPU 6 runs query 5 through session 7 to obtain database response 8 from database 2, and port 3 communicates this response to client application 4.

When usage of system 1 is at a sufficiently high level—for example where a the number of applications 4 submitting queries 5 outnumbers the total number of sessions 7, queue 14 holds a plurality of queries 5. This is best illustrated in FIG. 3. It will be appreciated that the number of queries 5, sessions 7 and responses 8 in FIG. 3 are not intended to precisely match the number of applications 4. The intention is only to provide a schematic representation of system 1 in a period of high activity. CPU 6 is in communication with queue 14 for monitoring each query 5 in the 14. CPU 6 allocates a session 7 to a query in queue 14 when a further predetermined condition is satisfied, in particular the third condition, which is discussed below.

In the present embodiment, each query 5 in queue 12 includes an identifier, the identifier being assigned by CPU 6. In other embodiments the identifier is inherent in query 5. The identifier is indicative of a priority tier for that query 5, this facilitating the administration of a protocol for ordering and prioritising queries 5 in queue 14. CPU 6 determines the priority tier for a query 5 in response to:

- The time that port 3 received query 5, an earlier received query receiving a higher priority tiers than one received later.
- The application 4 that submitted query 5 was received. In this embodiment, CPU 6 is programmed to identify certain applications as more important than others, and hence assign an identifier indicative of a higher priority tier to a more important application. In some embodiments, this is not done. In particular, there are embodiments where the application 4 that provided query 5 is not made known to CPU 6.
- The nature of the query 5. In this embodiment, CPU 6 is programmed to identify certain types of query as more important than others, and assign an identifier indicative of a higher priority tier to a more important query. In some embodiments, this is not done.
- A signal provided by the client. In this embodiment, client application 4 provides a signal indicative of the importance of query 5. For example, an urgent query includes a certain signal to indicate that the query is urgent, and CPU 6 is responsive to that signal for assigning an identifier indicative of a higher priority tier. In some embodiments, this is not done.

The manner in which these factors affect the level of priority tier is decided with reference to local policies and standards. In this embodiment, the most emphasis is placed on the time that port 3 received query 5, the rational being to ensure queries are dealt with chronologically unless exceptional circumstances dictate otherwise.

In the present embodiment, each identifier is unique and indicative of a unique priority tier. To this end, CPU 6 is also responsive to the identifiers of queries in queue 14 for ensuring uniqueness and for providing a priority tier that ranks the newly received query 5 in relation to any other queries 5 in queue 14. It will be appreciated that this should prevent problems arising from two queries having identical priority tiers.

The third condition is whether a query 5 has an identifier indicative of a higher priority tier than the respective identifier each—if any—other query 5 in queue 14. The third condition is satisfied when query 5 has an identifier indicative of a priority tier higher than any other query 5 in table. Otherwise, the third condition is not satisfied.

If the third condition is not satisfied, query 5 remains in queue 14. CPU 6 continuously monitors the queries 5 in queue 14 for checking whether the third condition is satisfied for each query 5 in queue 14. In other embodiments, the status of queries 5 in queue 14 in relation to the third condition is checked at predetermined times, such as when a session 7 is returned to register 12 or when a session 7 becomes idle.

When the first and third conditions are satisfied for a query 5, CPU 6 allocates an available database session 7 to query 5. As such, CPU 6 runs query 5 through session 7 to obtain database response 8 from database 2, and port 3 communicates this response to client application 4.

In other embodiments alternate methods are implemented for prioritising queries 5 in queue 14. In some embodiments, CPU 6 is responsive to

- One or more sessions 7 being in register 12;
- A query 5 having been in queue 14 for a predetermined period; and
- A query 5 having been in queue 14 for a longer period than one or more other queries 5 in queue 14.

In other embodiments, queries in queue 14 are simply dealt with in the order in which they were received by port 3. Other methods and or systems for managing queue 14 will be appreciated by those skilled in the art.

Figure 4:
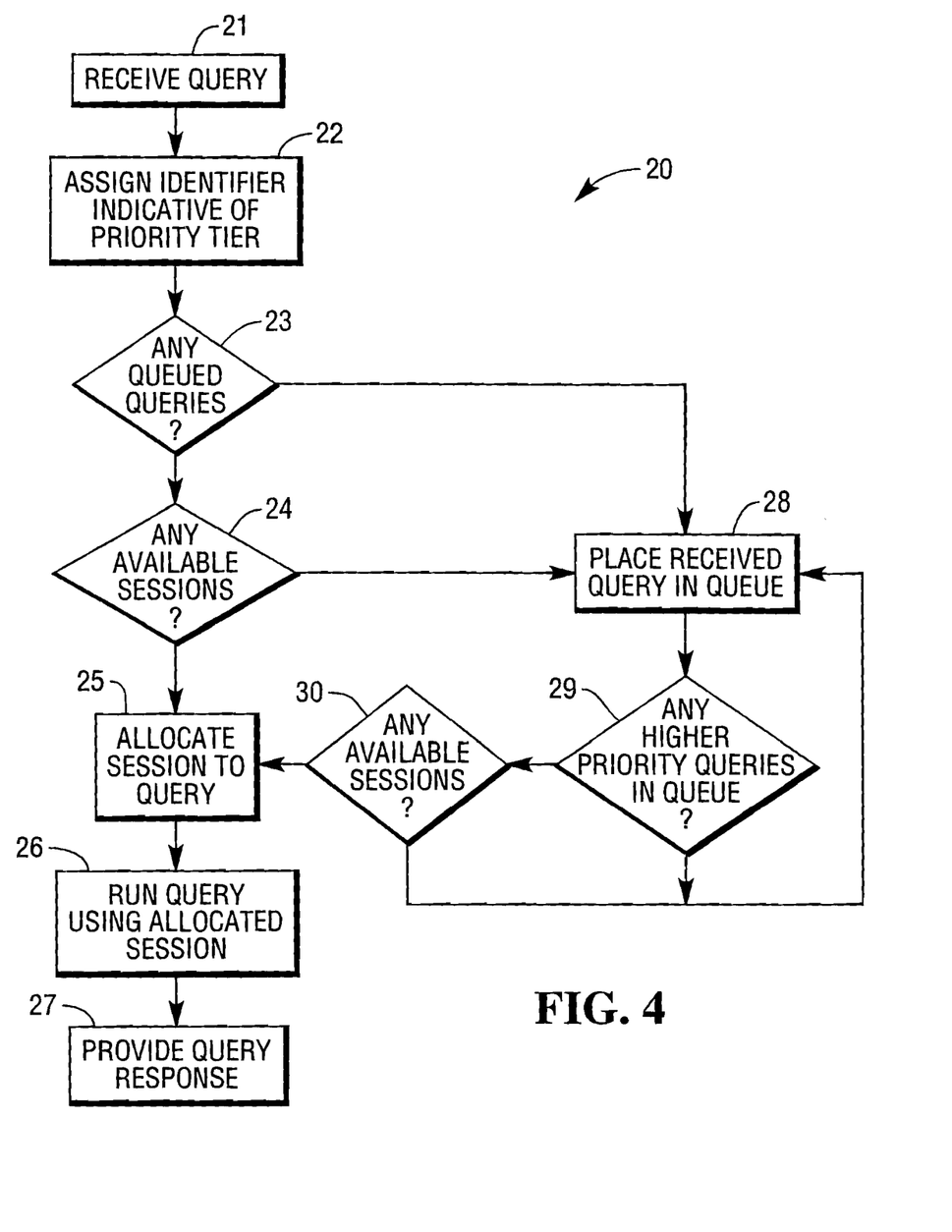
FIG. 4 is a flowchart illustrating an exemplary method according to the invention.

FIG. 4 illustrates an exemplary method 20 according to the first allocation procedure.

CPU 6 receives a query 5 at 21, and subsequently assigns received query 5 an identifier indicative of a priority tier at 22. As outlined above, the priority tier is a relative rank, and is selected by reference to the time received query 5 was received, the application 4 that sent received query 5, the nature of received query 5, and the priority tiers of any other queries in queue 14.

At 23, CPU 6 is responsive to whether there are any other queries 5 in queue 14. If there are any other queries 5 in queue 14, CPU 6 puts received query 5 in queue 14 at 28. If there are no other queries in queue 14, CPU 6 moves on to decision 24.

In other embodiments, CPU 6 is responsive to the identifier of received query 5 at 23. That is, CPU 6 is responsive to whether any queries in queue 14 include identifiers indicative of priority tiers higher than the priority tier indicated by the identifier of received query 5. If one or more queries 5 in queue 14 include a respective identifier indicative of a higher priority tier than the identifier of received query 5, CPU 6 puts received query 5 in queue 14 at 28. If received query 5 includes an identifier indicative of a priority tier higher than every (if any) query 5 in queue 14, CPU 6 moves on to decision 24.

At 24, CPU 6 is responsive to whether register 12 includes a session 7. If register 12 includes a session 7, CPU 6 allocates a session 7 from register 12 to received query 5 at 25. If register 12 does not include a session 7, the received query 5 is placed in queue 14 at 28.

Once a session 7 is allocated to received query 5, CPU 6 runs received query 5 through that session 7 at 26 to obtain a response 8 from database 2. This response is then communicated to the source of query 5 at 27. It will be appreciated that, in the present example using system 1, the source is the application 4 that provided received query 5.

If received query 5 is placed in queue 14 at 28, CPU 6 is responsive to whether any queries in queue 14 include identifiers indicative of priority tiers higher than the priority tier indicated by the identifier of received query 5 at 29. If one or more queries 5 in queue 14 include a respective identifier indicative of a higher priority tier than the identifier of received query 5, CPU 6 puts received query 5 in queue 14 at 28. It will be appreciated that this will result in a cyclic step at times, and the cycle is repeated until the appropriate conditions are reached. If received query 5 includes an identifier indicative of a priority tier higher than every (if any) query 5 in queue 14, CPU 6 moves on to decision 30.

At 30, CPU 6 CPU 6 is responsive to whether register 12 includes a session 7. If register 12 includes a session 7, CPU 6 allocates a session 7 from register 12 to received query 5 at 25, and received query 5 is processed as described with above. If register 12 does not include a session 7, the received query 5 is placed in queue 14 at 28, once again entering received query 5 into a cyclic phase of method 20.

It will be appreciated by those skilled in the art that the process for allocating identifiers and the respective priority tiers is modified to ensure a received query 5 is not left in a cyclic phase of method 20 for an extended period. In the present embodiment, this is achieved by placing a high emphasis on the time received query 5 was received when selecting a priority tier. That is, a query that has spent longer than a predetermined time in a cyclic phase has an identifier indicative of a priority tier that is higher than any identifier selectable by CPU 6. As such, received query 5 moves out of a cyclic phase for processing after that predetermined time. In other embodiments, alternate approaches are taken.

The above-described predetermined conditions are designed to be exemplary only. In other embodiments alternate conditions and or protocols are used.

An embodiment making use of the second allocation procedure will now be described. As foreshadowed implementations where the second allocation procedure is used, the allocation functionalities embedded within the runtime environment of database 2 are leveraged. For the sake of example, the second allocation procedure is described with reference to a JDBC-type database runtime environment. Those skilled in the art will understand how such leveraging is used in relation to alternate runtime environments.

Under the second procedure, it is convenient to consider a database session as having three distinct states:

Inactive, being when the session is not being used. In this state, the session remains idle and, were it not for register 12, would escape into the runtime environment of database 2 and be terminated.

Active, being the state where the session 7 actively seeks to process a query. If an active session is not able to locate a session for processing within a predetermined time, it becomes inactive.

In-use, being the state where the session is being used as a communication line between CPU 6 and database 2 for processing a query 5. As soon as the query is processed—that is, as soon as the query response 8 is received—the session reverts to the active state.

In this embodiment, register 12 does not hold registers, per se. Register 12 is indicative of a data structure that informs the runtime environment that sessions 7 are being used by someone. The rationale is that, in the absence of such a data structure, the runtime environment would eventually find and terminate the inactive sessions 7. Register 12 is, to some extent, a software barrier that allows sessions 7 to be reserved for use with system 1.

When a query 5 is received by CPU 6, that query is immediately placed in queue 14. In this embodiment, queue 14 has a conceptual front and a back, queries being placed at the back and taken from the front. CPU 6 sends out a signal to activate an inactive session 7 upon placing a query 5 in queue 6. In some embodiments this signal is only sent out when the last query placed in queue 14 is the only query in queue 14. In other embodiments the signal is sent out at a matter of course. It will be appreciate that inactive sessions 7 are not physically held in register 12 under the second allocation procedure; register 12 serves simply to prevent the runtime environment from terminating the inactive sessions 7. If a session is activated, following from the leveraged functionalities for the runtime environment this session will automatically process the query 5 at the front of queue 14. If there are no inactive sessions, the signal will not activate a session, and as such the query 5 will remain in queue 14.

When a session 7 has completed processing a query 5—that is, the relevant query response 8 has been obtained from database 2—that session 7 automatically looks to process a further query from the front of queue 14. If there are no further sessions in queue 14, that session 7 becomes inactive, and remains inactive until it is again activated by a signal from CPU 6. It follows that as soon as a query 7 has finished processing a first query 5, it is ready to process a further query 5. As such, there is a further reduced delay time during which sessions 7 are inactive and unavailable. Indeed, sessions 7 are substantially only unavailable when running queries. To this end, under the second allocation procedure, it is not necessary to take steps along the same lines as refreshing the register.

In some embodiments that make use of the second allocation procedure, some of the added functionalities described in relation to the first procedure are implemented, such as processes for ordering queries 5 in queue 14 or being responsive to identifiers.

It will be appreciated that the interpretation of "allocation" here differs from that of the first allocation procedure. Rather than an active process of selecting a session 7 for a query 5, under the second allocation procedure a session 7 is allocated to a query 5 by virtue of that query 5 being held out to receive an active session.

Figure 5:
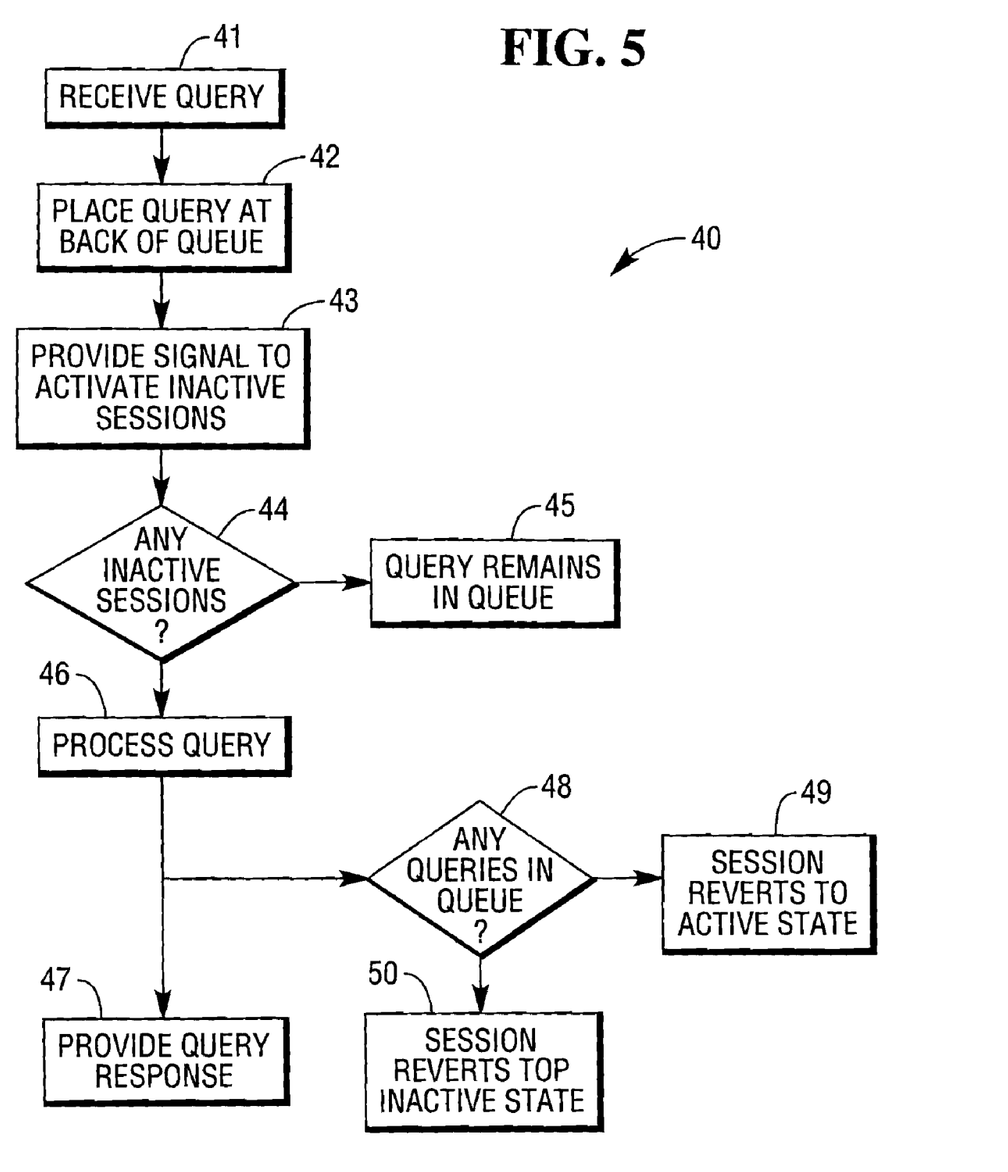
FIG. 5 is a flowchart illustrating a further exemplary method according to the invention.

FIG. 5 illustrates a flowchart to illustrate an exemplary method 40 associated with the second allocation procedure. A query 5 is received at 41 and placed into the back of queue 14 at 42.

CPU 6 then sends out a signal at 43 to activate any inactive sessions 7. If an inactive session 7 exists, that session 7 is activated and is allocated to received query 5 at 46. It will be appreciated that, given the logic of the method, there is only ever one query 5 in queue 14 at times when there are inactive sessions 7, and this query will only remain in queue 14 for the incremental period of time it takes for CPU 6 to send the signal; and activate an inactive session 7.

If there are no inactive sessions 7, received query 5 remains in queue 14 at 44. Received query 5 remains in queue 14 until an in-use session 7 reverts to the active state and is allocated to received session 7. More particularly, this does not occur until received queue 15 reaches the front of queue 14. Each time a session 7 reverts to the active state, received query 5 moves one place forward in queue 14, until such a time as it reaches the front.

If a session 7 is allocated to query 5 at 46, that query is processed to obtain a relevant query response 8 at 47. Following this, the obtained query response 8 is communicated to the source of received query 5 at 47. Simultaneously, the session 7 that was used to obtain that query response 8 reverts to the active state at 49. At that point, the active session 7 is either processes the query 5 at the front of queue 14, or, in the absence of queries in queue 14, reverts to the inactive state at 50.

Figure 6:
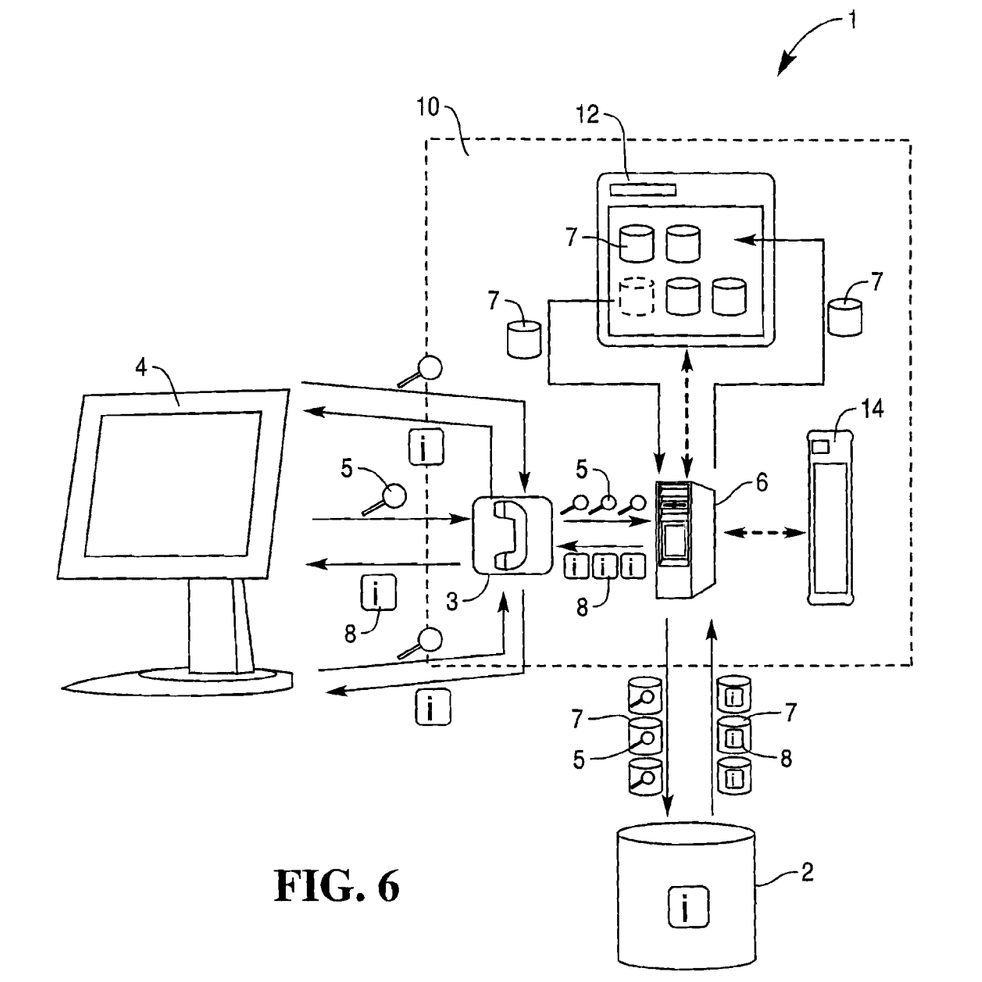
FIG. 6 is a further schematic view of the system of FIG. 1.

FIG. 6 graphically represents a further advantage of system 1. In this example, a single application 4 simultaneously submits three queries 5. In known systems where a session is allocated to an application, these queries are processed sequentially. In the present embodiment they are processed simultaneously, assuming sufficient sessions 7 are available in register 12. This provides an advantage in improving the speed at which responses to multiple queries from a single application are provided.

It will be appreciated that system 1 reduces the need for client application 6 to take precautionary measures when submitting a plurality of queries to database 2. This takes some onus off the writers of application 6, in that application 6 is able to relatively safely submit queries in bulk without concerns about ordering and organising execution. As such, system 1 is able to be used as a standard system for handling database communications.

Figure 7:
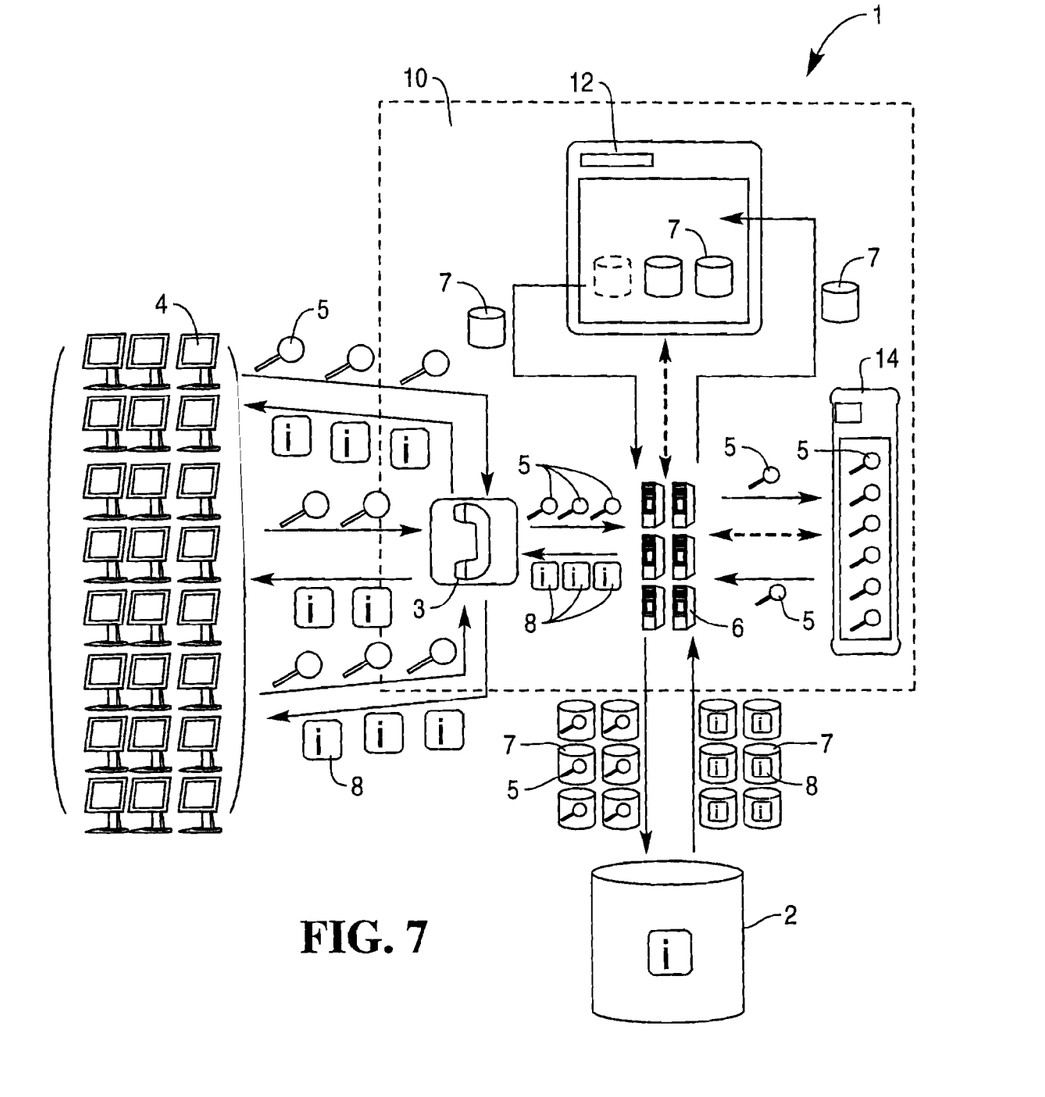
FIG. 7 is a further schematic view of the system of FIG. 1.

FIG. 7 illustrates an embodiment where a plurality of CPU's 6 are used. This provides an advantage in that queries having alternate priorities, purposes or time-constraints are able to be handled appropriately without the need to assign priority tiers or the like. For example, a client application 4 submits high priority queries to a first CPU 6, and routine queries to a second CPU 6. Often, a client application 4 requires special permissions to use a particular CPU 6. In some embodiments, a user of application 4 determines which CPU 6 is to be used. In other embodiments, protocols embedded within application 4 determine which CPU 6 is to be used.

It will be appreciated that system 1 allows for a more efficient use of database sessions than was provided by many known systems, in particular connection pooling. Applying the current components and terminology to the known example of connection pooling provides the following. In connection pooling, a session 7 is allocated to a client application 4. That query 5 is removed from register 12 at the time of allocation. Application 4 then gains control of that session 7, and uses it to run queries 5 of database 2 at will. These queries do not pass through CPU 6. The relevant session 7 is not returned to register 12 until the controlling application 4 takes positive steps to do so. While under the control of application 4, session 7 is idle—that is, not running a query—during some periods. These periods are often extended, particularly if application 4 neglects to return session 7 when querying is not necessary. The idle session 7 is not available for use by other applications 4. Hence, at times applications are prevented from querying database 2 although one or more sessions 7 are idle. Those skilled in the art will recognise this as less than efficient.

Under system 1, by allocating a session 7 to a query 5 (as opposed to an application 4), the above-described inefficiency of connection pooling is ameliorated. Sessions 7 are only unavailable while they are being used to run queries 5, and during incremental processing times before and after running queries 5. As such, neglecting the minor processing delays, a session 7 should not be in a state where it is idle and not available for use by any application 7.

The described embodiments describe respective systems for managing a database. It will be appreciated that this management is of the queries made of the respective databases only. In other embodiments, the management is broader than this, and is inclusive of other aspects of database management.

Although the present invention has been described with particular reference to certain preferred embodiments thereof, variations and modifications of the present invention can be effected within the spirit and scope of the following claims.

The invention claimed is:

1. A computer system for managing a database, the computer system including:
   a first interface component configured to receive from a third-party client a query of the database;
   a processor component responsive to the first interface component and configured to:
      allocate a database session to the query;
      run the query through the allocated database session to obtain a query response from the database; and
      after obtaining the query response from the database, allocate the database session to another query.

2. A system according to claim 1 including a second interface responsive to the processor for communicating the query response to the client.

3. A system according to claim 2 wherein the second interface is defined by the first interface.

4. A system according to claim 1 wherein the processor is part of a server that maintains a predetermined number of database sessions.

5. A system according to claim 4 wherein the server initiates the predetermined number of database sessions.

6. A system according to claim 4 wherein maintaining the predetermined number of database sessions includes keeping a register of at least one of the predetermined database sessions through which a query is not being run.

7. A system according to claim 6 wherein the processor removes the allocated database session from the register.

8. A system according to claim 7 wherein the processor returns the allocated database session to the register after the associated query response is obtained from the database.

9. A system according to claim 4 wherein the server includes a data structure for maintaining the predetermined number of database sessions such that the sessions do not escape into the runtime environment of the database.

10. A system according to claim 1 including a queue for holding one or more queries.

11. A system according to claim 10 wherein the query is placed in the queue until the processor allocates a database session to the query.

12. A system according to claim 11 wherein the processor is responsive to the existence of other queries in the queue before allocating a database session to a particular query in the queue.

13. A system according to claim 1 wherein the processor leverages embedded functionalities of the database for allocating the database session to the query.

14. A system according to claim 1 including a plurality of processors.

15. A system according to claim 1 wherein the first interface receives a plurality of queries and the processor runs the plurality of queries through respective plurality of allocated sessions in parallel.

16. A system according to claim 1 wherein the processor is responsive to the first interface for providing a signal to activate an inactive database session.

17. A computer-implemented method for managing a database, where the method, when executed by a computer system, causes the computer system to:
   receive from a third-party client a query of the database;
   allocate a database session to the query;
   run the query through the allocated database session to obtain a query response from the database; and
   after obtaining the query response from the database, allocate the database session to another query.

18. A computer-implemented method according to claim 17, where the method, when executed by a computer system, further causes the computer system to communicate the query response to the third-party client.

19. A computer-implemented method according to claim 17, wherein the receiving of the query comprises receiving the query by a first interface, and wherein the communicating of the query response comprises: communicating the query by a second interface.

20. A computer-implemented method according to claim 19, wherein the second interface is defined by the first interface.

21. A computer-implemented method according to claim 17, where the method, when executed by a computer system, further causes the computer system to maintain a predetermined number of database sessions.

22. A computer-implemented method according to claim 21, where the method, when executed by a computer system further causes the computer system to initiate the predetermined number of database sessions.

23. A computer-implemented method according to claim 21, wherein the maintaining of the predetermined number of database sessions comprises keeping a register of at least one of the predetermined database sessions through which a query is not being run.

24. A computer-implemented method according to claim 23, where the method, when executed by a computer system further causes the computer system to remove the allocated database session from the register.

25. A computer-implemented method according to claim 24, where the method, when executed by a computer system further causes the computer system to return the allocated database session to the register after the associated query response is obtained from the database.

26. A computer-implemented method according to claim 21, where the method, when executed by a computer system further causes the computer system to maintain in a data structure the predetermined number of database sessions such that the sessions do not escape into the runtime environment of the database.

27. A computer-implemented method according to claim 17, where the method, when executed by a computer system further causes the computer system to hold one or more queries in a queue.

28. A computer-implemented method according to claim 27, where the method, when executed by a computer system further causes the computer system to place the query in the queue until a database is created.

29. A computer-implemented method according to claim 28, where the method, when executed by a computer system further causes the computer system to be responsive to one or more other queries in the at least one queue before allocating a database session to a particular one of the one or more queries in the at least one queue.

30. A computer-implemented method according to claim 17, where the method, when executed by a computer system further causes the computer system to leverage embedded functionalities of the database for allocating the database session to the query.

31. A computer-implemented method according to claim 17, wherein the computing system includes multiple processors, and wherein the method, when executed by a computer system further causes the processors to process the query in parallel.

32. A computer-implemented method according to claim 17, where when executed by a computer system further causes the computer system to:
receive multiple queries; and
process the queries through respective plurality of allocated sessions in parallel.

33. A computer-implemented method according to claim 17, where the method when executed by the computer system further causes the computer system to provide a signal to activate an inactive database session in response to a first interface receiving the query from the third-party client.

34. A non-transient computer readable storage medium storing at least executable code that when executed by a computing system causes the computing system to:
receive from a third-party client a query of a database;
allocate a database session to the query;
run the query through the allocated database session to obtain a query response from the database; and
after obtaining the query response from the database, allocate the database session to another query.

35. A non-transient computer readable storage medium according to claim 34, wherein when the executable code is executed by the computing system, the executable code further causes the computing system to communicate the query response to the third-party client.

36. A non-transient computer readable storage medium according to claim 34,
wherein the receiving of the query comprises receiving the query by a first interface, and
wherein the communicating of the query response comprises communicating the query by a second interface.

37. A non-transient computer readable storage medium according to claim 36, wherein the second interface is defined by the first interface.

38. A non-transient computer readable storage medium according to claim 34, wherein when the executable code is executed by the computer system, the executable code further causes the computer system to maintain a predetermined number of database sessions.

39. A non-transient computer readable storage medium according to claim 38, wherein when the executable code is executed by a computer system, the executable code further causes the computer system to initiate the predetermined number of database sessions.

40. A non-transient computer readable storage medium according to claim 38, wherein the maintaining of the predetermined number of database sessions comprises keeping a register of at least one of the predetermined database sessions through which a query is not being run.

41. A non-transient computer readable storage medium according to claim 40, wherein when the executable code is executed by the computer system, the executable code further causes the computer system to remove the allocated database session from the register.

42. A non-transient computer readable storage medium according to claim 41, wherein when the executable code is executed by the computer system, the executable code further causes the computer system to return the allocated database session to the register after the associated query response is obtained from the database.

43. A non-transient computer readable storage medium according to claim 38, wherein when the executable code is executed by the computer system, the executable code further causes the computer system to maintain in a data structure the predetermined number of database sessions such that the sessions do not escape into the runtime environment of the database.

44. A non-transient computer readable storage medium according to claim 34, wherein when the executable code is executed by the computer system, the executable code further causes the computer system to hold one or more queries in a queue.

45. A non-transient computer readable storage medium according to claim 34, wherein when the executable code is executed by a computer system, the executable code further causes the computer system to place the query in the queue until a database is created.

46. A non-transient computer readable storage medium according to claim 34, wherein when the executable code is executed by a computer system, the executable code further causes the computer system to be responsive to one or more other queries in the at least one queue before allocating a database session to a particular one of the one or more queries in the at least one queue.

47. A non-transient computer readable storage medium according to claim 34, wherein when the executable code is executed by a computer system, the executable code further causes the computer system to leverage embedded functionalities of the database for allocating the database session to the query.

48. A non-transient computer readable storage medium according to claim 34, wherein the computing system includes multiple processors, and wherein when the executable code is executed by a computer system, the executable code further causes the processors to process the query in parallel.

49. A non-transient computer readable storage medium according to claim 34, wherein when the executable code is executed by a computer system, the executable code further causes the computer system to:
  receive multiple queries; and
  process the queries through respective plurality of allocated sessions in parallel.

50. A non-transient computer readable storage medium according to claim 34, wherein when the executable code is executed by a computer system the executable code further causes the computer system to: provide a signal to activate an inactive database session in response to a first interface receiving the query from the third-party client.

* * * * *